(12) United States Patent
Zhao et al.

(10) Patent No.: US 12,012,334 B2
(45) Date of Patent: Jun. 18, 2024

(54) METHOD FOR REMOVING ASH FROM SOLID CARBONACEOUS MATERIAL

(71) Applicant: National Institute of Clean-and-Low-Carbon Energy, Beijing (CN)

(72) Inventors: Lijun Zhao, Beijing (CN); Wenhua Li, Beijing (CN); Aiguo Chen, Beijing (CN); Fan Jin, Beijing (CN); Xiaolin Jiang, Beijing (CN); Huidong Liu, Beijing (CN); Yongfeng Xiao, Beijing (CN)

(73) Assignee: NATIONAL INSTITUTE OF CLEAN-AND-LOW-CARBON ENERGY, Beijing (CN)

( * ) Notice: Subject to any disclaimer, the term of this patent is extended or adjusted under 35 U.S.C. 154(b) by 624 days.

(21) Appl. No.: 17/284,594

(22) PCT Filed: Sep. 26, 2019

(86) PCT No.: PCT/CN2019/108066
§ 371 (c)(1),
(2) Date: Apr. 12, 2021

(87) PCT Pub. No.: WO2020/073813
PCT Pub. Date: Apr. 16, 2020

(65) Prior Publication Data
US 2021/0347640 A1    Nov. 11, 2021

(30) Foreign Application Priority Data
Oct. 12, 2018   (CN) .......................... 201811190698.2

(51) Int. Cl.
*C01B 32/05*   (2017.01)
*C10L 5/02*    (2006.01)
*C10L 9/02*    (2006.01)

(52) U.S. Cl.
CPC ............... *C01B 32/05* (2017.08); *C10L 9/02* (2013.01); *C10L 5/02* (2013.01); *C10L 2290/24* (2013.01); *C10L 2290/545* (2013.01)

(58) Field of Classification Search
CPC ... C01B 32/05; C10L 9/02; C10L 5/02; C10L 2290/24; C10L 2290/545; C10L 2290/54; C10L 5/04; C10L 10/04; C10L 2200/029
See application file for complete search history.

(56) References Cited

U.S. PATENT DOCUMENTS

| | | | |
|---|---|---|---|
| 4,545,891 A | 10/1985 | Meyers et al. | |
| 5,312,462 A | * 5/1994 | Nowak | ...................... C10L 9/02 44/624 |

(Continued)

FOREIGN PATENT DOCUMENTS

| | | |
|---|---|---|
| CN | 1708574 A | 12/2005 |
| CN | 101607226 A | 12/2009 |

(Continued)

OTHER PUBLICATIONS

Mukherjee, et al., Effects of alkali treatment on ash and sulphur removal from Assam coal, Fuel Processing Technology 2003; 85: 93-101 (Year: 2003).*

(Continued)

*Primary Examiner* — Daniel C. McCracken
(74) *Attorney, Agent, or Firm* — Calfee, Halter & Griswold LLP

(57) ABSTRACT

A method for removing ash from a solid carbon material: Reaction conditions are mild, and ash may be removed more effectively. The ash removing method comprises: S1) mixing an alkaline sub-molten salt medium and a solid carbonaceous material to be treated, heating so that alkali and ash in the solid carbonaceous material to be treated react in the alkaline sub-molten salt medium, and performing solid-liquid separation on a mixed slurry resulting from the (Continued)

Mix an alkaline sub-molten salt medium and a solid carbonaceous material to be treated, heat so that alkali and ash in the solid carbonaceous material to be treated react in the alkaline sub-molten salt medium, and perform solid-liquid separation on a mixed slurry resulting from the reaction to obtain a first solid product and an alkali treatment solution;   — S1)

Use an acid solution to perform acid cleaning treatment on the first solid product, and perform solid-liquid separation again to obtain a second product and an acid cleaning solution.   — S2)

reaction to obtain a first solid product and an alkali treatment solution, wherein in the alkaline sub-molten salt medium, the mass fraction of the alkali is greater than or equal to 50%; S2) using an acid solution to perform acid cleaning treatment on the first solid product, and performing solid-liquid separation again to obtain a second solid product and an acid cleaning solution.

11 Claims, 1 Drawing Sheet

(56) References Cited

U.S. PATENT DOCUMENTS

| | | | |
|---|---|---|---|
| 6,235,253 B1 | 5/2001 | Holcombe et al. | |
| 2006/0096166 A1* | 5/2006 | Brooks | C10L 5/366 |
| | | | 44/620 |

FOREIGN PATENT DOCUMENTS

| | | | | |
|---|---|---|---|---|
| CN | 101773870 A | | 7/2010 | |
| CN | 101774565 | * | 7/2010 | C01B 31/02 |
| CN | 101774565 A | | 7/2010 | |
| CN | 104891470 A | | 9/2015 | |
| CN | 107344141 A | | 11/2017 | |
| JP | 2017166009 A | | 9/2017 | |
| RU | 2141449 C1 | | 11/1999 | |

OTHER PUBLICATIONS

Jiang Wei et al. "Low-Temperature Leaching Process of Potassium Feldspar with Sub-Molten Salt" (2019) Journal of East China University of Technology (Natural Science Edition) 045.002: 206-215.

Office Action from Japanese Patent Application No. 2021-516987 mailed Apr. 18, 2022.

Examination Report from German Application No. DE1120190051105 dated Mar. 30, 2022.

Wang et al., "Removal of Mineral Matter from Coal by Alkali Treatment," Fuel Processing Technology, 13 1986, pp. 279-289.

Yi, Zhang "Amazing Submolten Salt" IEEE Spectrum No. 4:66-67.

Yun, Zhu "Metallurgical Equipment" (2009) Metallurgical Industry Press: 74-75.

"Required Reading for Electroplating Workers" (1992) Tianjin Machinery Industry Administration Bureau China Machine Press:174-175.

Wei, Xie "Deep Processing and Application of Microcrystalline Ink" (2006) Hunan University Press:18-19.

* cited by examiner

METHOD FOR REMOVING ASH FROM SOLID CARBONACEOUS MATERIAL

INCORPORATION OF RELATED APPLICATIONS

This application is a 35 USC § 371 national stage of international application No. PCT/CN2019/108066, which is entitled "METHOD FOR REMOVING ASH FROM SOLID CARBONACEOUS MATERIAL," was filed Sep. 26, 2019, and claims priority to Chinese Application Nos. 201811190698.2, filed on Oct. 12, 2018, both of which are incorporated herein by reference as if fully set forth.

FIELD

The present disclosure relates to the technical field of removing ash from the solid carbonaceous materials, and particularly to a method for removing ash in the solid carbonaceous materials.

BACKGROUND

Solid carbonaceous materials refer to the solid materials which contain a large amount of carbon, and include chemical materials such as solid fuels, activated carbon, asphalt, etc.; wherein the solid fuels refer to the combustible solid materials that are capable of producing heat or power, and generally comprise carbon or hydrocarbons, the natural solid fuels are wood, peat, lignite, bituminous coal, anthracite, oil shale, etc., and the solid fuels obtained by processing are such as charcoal, coke, briquet and coal ball, etc. The solid carbonaceous materials generally contain ash, and when in use, the amount of ash content directly affects the performance of the solid carbonaceous materials.

Taking coal as an example, the coals in China have complex types, an inferior quality as a whole and relatively high ash content, the coal quality has gradually deteriorated following the mining operations for many years. The commercial coal has a high ash content, with an average ash content between 20 wt % to 24 wt %, and the average ash content of the coals used for power generation reaches 28 wt %. Among the main routes of coal utilization, if the ash content of the coals used for power generation is reduced by 1 wt %, the calorific value can be increased by 200-360 J/g, and the standard coal consumption for power generation is reduced by 2-5 g per kwh. When the ash content of the coking coal is lowered by 1 wt %, the coking coal consumption for iron-making is reduced by 2.66 wt %, and the utilization coefficient of the iron-making blast furnace may be increased by 3.99%. The Synthetic ammonia production process can save 20 wt % of coal if the washed and selected anthracite coal is used. The high value-added applications for coals also include the coal replacing oil and coal-based carbon materials, which impose strict limitation in regard to the ash content in coals. As regards a "coal water slurry used as a fuel" which belongs to the coal replacing oil, it is stipulated in the national standards of the People's Republic of China that the product with grade I shall have an ash content less than 6 wt %. In regard to the coal-based carbon materials, the recommended standards of ash content in the coal are as follows: ash content in the activated carbon is less than 2 wt %, ash content in the carbon block and char electrodes is less than 6 wt %, and ash content in the electrode paste is lower than 8 wt %. The coal with an ash content below 1-3 wt % is generally called as the ultra-pure coal, which can be used for preparing a fine coal water slurry that is burned for replacing oil, the coal water slurry has a high calorific value, the renovation and improvement of boiler is not required, and its emissions are in compliance with the environment protection rules and regulations. In addition, the ultra-pure coal can also be used in internal combustion engines and combustion gas turbines, as well as power equipment such as aviation turbine engines.

The refining methods of coal, especially for producing refined coal with a high added-value and low ash content, is mainly composed of the chemical methods and the physical methods. The chemical methods refer to the processes of performing chemical reactions between the chemical agents and the components in coal; the physical methods are mainly consisting of an oil agglomeration process and a floccules flotation process, both serve to finely grind the feed coal to enable monomer separation by using the difference in lipophilicity and hydrophobicity of the organic matters and inorganic minerals in the coal; the lipophilic fine organic matters are agglomerated by means of the bridging liquid and shearing force of neutral oils such as hydrocarbons, such that the hydrophilic mineral particles are dispersed in water, and are subsequently subjected to separation by means of the screening, centrifugation or flotation process. The physical methods are relatively simple and practicable, but have poor adaptability and low efficiency of ash removal, while the chemical methods have strong adaptability and high efficiency of ash removal. The chemical methods currently used are mainly consisting of hydrofluoric acid method, conventional acid-alkali method, molten alkali leaching method, and chemical coal method. The conventional acid-alkali method is the most widely used method, its basic principle resides in reacting an alkali liquor with the minerals of coal under certain conditions, then washing the formed inorganic compounds with an acid, and performing filtering and washing process to separate from the organic matters of coal. Although the conventional acid-alkali method has strong adaptability and high efficiency of ash removal, it generally requires to operate at the high temperature of 150-250° C. under a high pressure, and the mass ratio of the alkali liquor to coal may be 3-10 or more. The water consumption is high during the whole process, the reaction conditions are relatively rigorous, the used amount of alkali is large, the handling capacity of coal is small, such that the difficulty and cost of subsequently recovering alkali are increased.

SUMMARY

Embodiments of the present disclosure provide a method for removing ash in the solid carbonaceous materials. The reaction conditions are mild and the ash can be removed in a more efficient manner, so as to reduce the used amount of alkali and water and increase the handling capacity of the solid carbonaceous materials, thereby lowering the difficulty and costs of recovering alkali.

In order to achieve the above objects, the present disclosure adopts the following technical solutions:

Embodiments of the present disclosure provide a method for removing ash in the solid carbonaceous materials, the method comprises:

S1) mixing a sub-molten salt medium of an alkali with a solid carbonaceous material to be treated, heating the mixture to react the alkali with the ash in the solid carbonaceous material to be treated in the sub-molten salt medium of the alkali, and subjecting the reacted mixed slurry to a solid-liquid separation to obtain a first solid product and an alkali treatment liquid, wherein the mass fraction of said alkali in the sub-molten salt medium of the alkali is 50% or more;

S2) subjecting the first solid product to an acid washing treatment with an acid liquor and performing solid-liquid separation once more to obtain a second solid product and a pickling solution.

Optionally, the mass ratio of the alkali to the solid carbonaceous materials to be treated is 0.1-2:1.

Optionally, the sub-molten salt medium of the alkali is mixed with the solid carbonaceous materials to be treated under a kneading action.

Optionally, the reaction is performed under a temperature within a range of 100-200° C. and a normal pressure for 0.5-9 h.

Optionally, the method for removing ash further comprises cooling the reacted mixed slurry by means of dilution with water prior to subjecting the reacted mixed slurry to a solid-liquid separation.

Optionally, the temperature after the cooling process is within a range of 10-99° C.

Optionally, the cooling time is 3 h or less.

Optionally, the $n^{th}$ acid washing treatment is performed with the acid liquor in counter-current contact with the first solid product, wherein n is equal to or greater than 2.

Optionally, the $n^{th}$ acid washing treatment is performed with the acid liquor in counter-current contact with the first solid product, the acid washing treatment specifically comprises: a solid product obtained after the $i-1^{th}$ acid washing treatment is subjected to an acid washing treatment by using a pickling solution obtained after the $i^{th}$ acid washing treatment, and the first solid product is subjected to an acid washing treatment by using a pickling solution obtained after the second acid washing treatment, wherein i is a natural number and $2 \leq i \leq n$.

Optionally, the yield of the second solid product is equal to or greater than 95%.

Optionally, the mass fraction of ash in the second solid product is 1% or less.

Optionally, the mass fraction of ash in the second solid product is 0.2% or less.

The embodiments of the present disclosure provide a method for removing ash in the solid carbonaceous materials; by using high reaction activity of sub-molten salt medium, the alkali can destroy or decompose the mineral components in a more effective manner, and then by means of the acid washing treatment, the destroyed or decomposed mineral components can dissolved and extracted, so as to fulfill the purpose of ash removal. Given that the sub-molten salt medium produces a vapor pressure less than the atmospheric pressure and it has a high reaction activity, the whole reaction can be carried out under a normal pressure, the reaction conditions are milder and the ash can be removed in a more efficient manner than the acid-alkali method used in the related art, so as to reduce the used amount of alkali and water and increase the handling capacity of the solid carbonaceous materials, thereby lowering the difficulty and costs of recovering alkali.

BRIEF DESCRIPTION OF THE DRAWINGS

In order to illustrate the technical solutions in the embodiments of the present disclosure more clearly, the following content will briefly introduce the accompanying drawings required for describing the embodiments. Obvious, the accompanying drawings in the following description merely show some embodiments of the present disclosure, and a person of ordinary skill in the art may still derive other drawings from these accompanying drawings without paying a creative labor.

DETAILED DESCRIPTION

The following content will clearly and completely describe the technical solution in the embodiments of the present disclosure with reference to the accompanying drawings of the embodiments of the present disclosure. It shall be understood that the embodiments described herein are merely some of the embodiments of the present disclosure, instead of enumerating all the embodiments of the present disclosure. Based on the embodiments of the present disclosure, a person of ordinary skill in the art would derive all other embodiments of the present disclosure without paying a creative labor, any of which falls into the protection scope of the present disclosure.

Figure 1:
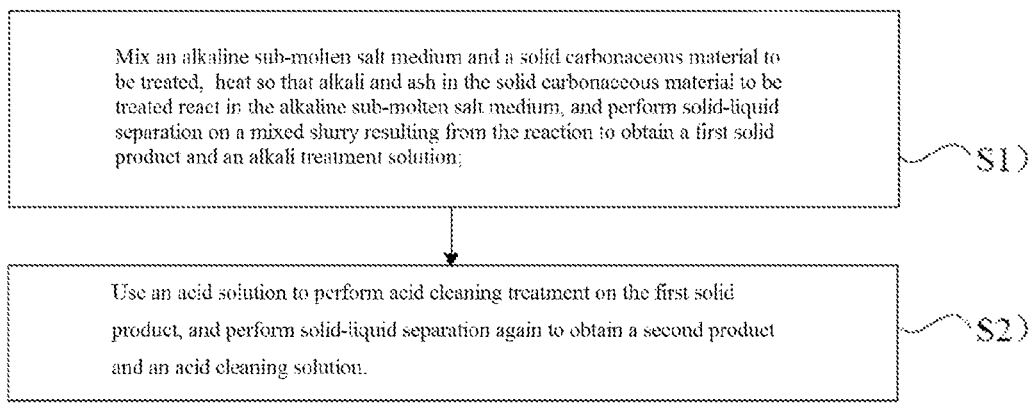
FIG. 1 illustrates a schematic flow chart of a method for removing ash from the solid carbonaceous materials provided by an embodiment of the present disclosure.

With reference to FIG. 1, embodiments of the present disclosure provide a method for removing ash from the solid carbonaceous materials, the method comprises:

S1) mixing a sub-molten salt medium of an alkali with a solid carbonaceous material to be treated, heating the mixture to react the alkali with the ash in the solid carbonaceous material to be treated in the sub-molten salt medium of the alkali, and subjecting the reacted mixed slurry to a solid-liquid separation to obtain a first solid product and an alkali treatment liquid, wherein the mass fraction of said alkali in the sub-molten salt medium of the alkali is 50% or more;

S2) subjecting the first solid product to an acid washing treatment with an acid liquor and performing solid-liquid separation once more to obtain a second solid product and a pickling solution.

Ash in a solid carbonaceous material refers to the residue of the solid carbonaceous material after calcination, the solid carbonaceous material is subjected to a series of physical and chemical changes at high temperatures, in which the organic components are volatilized and dissipated, while the inorganic components (inorganic salts and oxides) are left behind, such residues are referred to as ash.

Ash is consisting of oxides or salts of various mineral elements, which are mainly Si, Al, Ca, Mg, K, Na, P, S, Fe, as well as lithium (Li), gallium (Ga), uranium (Ur), mercury (Hg), other rare and scattered elements as well as noble metals.

The sub-molten salt medium is sodium hydroxide or potassium hydroxide having a mass fraction of 50% or more. Illustratively, the mass ratio of the alkali to water may be 1:1, 1.5:1, 2:1, 3:1 or 4:1. The sub-molten salt medium is an alkali metal ionization medium with a high concentration providing negative oxygen ions having high activity, it is between the molten salt medium and the electrolyte solution medium, has excellent physical and chemical properties such as low vapor pressure, high boiling point and desirable fluidity, and excellent reaction and separation characteristics including high activity factor, high reaction activity, and adjustable separation function, thus the sub-molten salt medium can realize the decomposition and conversion of mineral components with high efficiency. According to the above properties of the sub-molten salt, the vapor pressure generated in the present disclosure is lower than a normal pressure, and the highly active reaction can be performed under the atmospheric pressure.

The embodiments of the present disclosure provide a method for removing ash in the solid carbonaceous materials; by using high reaction activity of sub-molten salt medium, the alkali can destroy or decompose the mineral components in a more effective manner, and then by means of the acid washing treatment, the destroyed or decomposed mineral components can dissolved and extracted, so as to fulfill the purpose of ash removal. Given that the sub-molten salt medium produces a vapor pressure less than the atmospheric pressure and it has a high reaction activity, the whole reaction can be carried out under a normal pressure, the reaction conditions are milder and the ash can be removed in a more efficient manner than the acid-alkali method used in the related art, so as to reduce the used amount of alkali and water and increase the handling capacity of the solid carbonaceous materials, thereby lowering the difficulty and costs of recovering alkali.

Wherein, prior to mixing sub-molten salt medium of an alkali with a solid carbonaceous material to be treated, the method further comprises: crushing the solid carbonaceous material to be treated into particles having a particle size less than 5 mm, preferably less than 1 mm.

The present disclosure does not impose limitation in regard to the kind and ash content of the solid carbonaceous material to be treated, the solution is applicable to ash removal of various solid carbonaceous materials. In the description, the solid carbonaceous material is a broad concept which may include: coal, residues of direct liquefaction of coal, heavy residue oil, coke, petroleum coke, oil sands, shale oil, carbonaceous industrial waste or tailings, biomass, synthetic plastics, synthetic polymers, waste tires, municipal solid waste, bitumen and/or mixtures thereof.

Taking coal as an example, the alkali/coal ratio can be flexibly adjusted depending on the different coal type and ash content.

For example, in regard to the coal with a low ash content, a lower alkali/coal ratio may be selected, such as 0.4:1; in regard to the coal with a high ash content, a high alkali/coal ratio may be selected, such as 1.5:1.

Therefore, the mass ratio of the alkali to the solid carbonaceous materials to be treated is optionally 0.1-2:1.

In an embodiment of the present disclosure, the mass fraction of said alkali in the sub-molten salt medium of the alkali is 50% or more. Illustratively, the mass ratio of the alkali to water may be 1:1, 1.5:1, 2:1, 3:1, or 4:1. In this way, the sub-molten salt medium can be formed to improve the ash removal efficiency.

In yet another embodiment of the present disclosure, the sub-molten salt medium of the alkali is mixed with the solid carbonaceous materials to be treated under a kneading action.

When the sub-molten salt medium is mixed with the solid carbonaceous material to be treated and subjected to a reaction, the materials are viscous at an elevated temperature. Kneading is an operation of uniformly mixing the paste-like and viscous materials by using the mechanical stirring. It is common practice to use a pair of coordinated rotating/blades to produce a shearing action, so that the viscous materials, in semi-dry state or rubber-like form, react rapidly to obtain the uniform blending and stirring. As compared with the stirring process in the ordinary meaning, the kneading is more suitable for blending of highly viscous materials, so as to mix the materials in a more uniform manner, thereby improving ash removal efficiency; in addition, the kneading process can reduce the pulverization phenomenon of the materials caused by stirring, if the materials are excessively pulverized, the cost of subsequent solid-liquid separation will be increased, and the yield of product is adversely affected.

The present application does not specifically define the reaction temperature, pressure and time. In an embodiment of the present disclosure, the reaction is performed under a temperature within a range of 100-200° C., preferably 105-150° C. and a normal pressure for 0.5-9 h, preferably 2-6 h.

The normal pressure is an atmospheric pressure, that is, the gas pressure generated in the atmosphere in our daily life, the standard atmospheric pressure is 101,325 Pa. Each place has an actual atmospheric pressure which is not necessarily equal to the standard atmospheric pressure because of the different geographical location, altitude and temperature, thus the normal pressure can be approximately considered as a standard atmospheric pressure.

In the embodiments of the present disclosure, the reaction temperature is 50-100° C. lower than the conventional acid-alkali method, the reaction pressure is at a normal pressure, the reaction conditions are mild, and the ash removal efficiency is high, and the reaction time can be shortened.

It shall be noted that in practical applications, after step S1) is completed, the obtained mixed slurry is in a high-temperature viscous state, and the operation difficulty is increased if the solid-liquid separation is directly performed; in addition, if a temperature reduction treatment is performed before the solid-liquid separation, the mixed slurry is coagulated into solids with certain hardness and strength, so that the treatment difficulty is further increased. Therefore, it is preferable that the method for removing ash further comprises cooling the reacted mixed slurry by means of dilution with water prior to subjecting the reacted mixed slurry to a solid-liquid separation. In this way, by diluting the reacted mixed slurry, on one hand, the temperature of the reacted mixed slurry can be lowered and the industrial separation can be performed in an economic manner; on the other hand, after the mixed slurry is diluted by adding water, the mixed slurry can keep a flowable state, and the mixed slurry is prevented from being coagulated into solids.

The present application does not limit the temperature after the cooling process, provided it is convenient to perform the solid-liquid separation. In an embodiment of the present disclosure, the temperature after the cooling process is within a range of 10-99° C., preferably 30-60° C.

It should be further explained that that in practical application, after cooling the reacted mixed slurry to 10-99° C., the system is in a metastable state; when the mixed slurry is standing still for a long time, it will cause precipitation of the water-soluble alkali metal salts; thus it is preferable that the cooling time is 3 h or less, more preferably 1 h or less. Such an arrangement allows for a timely solid-liquid separation of the materials after cooling, avoid precipitation of the residues caused by unstability of system, thereby the ash removal efficiency is not affected. If the treatment is not performed timely for some reason, the cooled residues shall be initially broken, or the system is reheated and viscous, then diluted by adding with water.

It is further preferred that the cooling time is less than or equal to 30 minutes.

Furthermore, the cooling time is 10-15 min.

The solid-liquid separation may be performed by means of filtration.

In another embodiment of the present disclosure, the method further comprises: after the solid-liquid separation and prior to subjecting the first solid product to an acid washing treatment with an acid liquor, washing the first solid product with water. Some of the water-soluble alkali metal salts can be washed away.

The specific mode of the acid washing treatment is not limited herein, the first solid product may be subjected to one or more acid washing treatments by using the acid liquor.

In an embodiment of the present disclosure, the $n^{th}$ acid washing treatment is performed with the acid liquor in counter-current contact with the first solid product, wherein n is equal to or greater than 2.

The acid washing treatment specifically comprises: a solid product obtained after the $i-1^{th}$ acid washing treatment is subjected to an acid washing treatment by using a pickling solution obtained after the $i^{th}$ acid washing treatment, and the first solid product is subjected to an acid washing treatment by using a pickling solution obtained after the second acid washing treatment, wherein i is a natural number and $2 \leq i \leq n$.

In the embodiments of the present disclosure, the counter-current contact mode is adopted such that the acid washing treatment of the solid product having the lowest ash content can be performed by means of the pickling solution having the lowest ash content, the solid product having the gradually higher ash content is subjected to the acid washing treatment along with an increased ash content of the pickling solution; such an arrangement can maximize the pickling effect and further reduce the ash content in the solid carbonaceous material under a circumstance of a certain amount of acid liquor.

Figure 2:
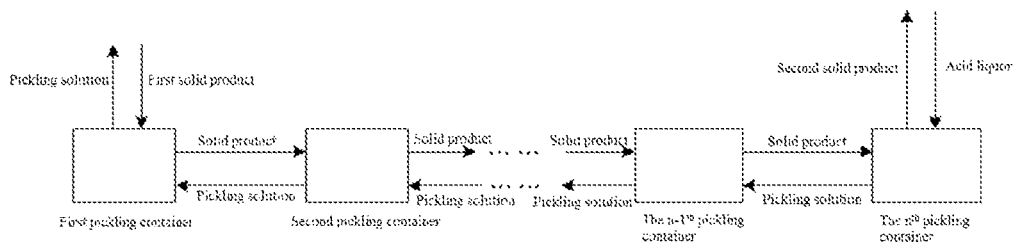
FIG. 2 illustrates a schematic flow diagram of performing the $n^{th}$ acid washing treatment by using the acid liquor in counter-current contact with the first solid product provided by an embodiment of the present disclosure.

In actual practice, referring to FIG. 2, the first solid product may be introduced into a first pickling container, the first solid product is subjected to a first acid washing treatment by using a pickling solution generated in a second pickling container to obtain a solid product and a pickling solution; the solid product generated after the first acid washing treatment is introduced into the second pickling container, the solid product in the second pickling container is subjected to a second acid washing treatment by using a pickling solution generated in a third pickling container to again obtain a solid product and pickling solution, and so on, the solid product generated in the $n-1^{th}$ pickling container is introduced into the $n^{th}$ pickling container, the acid washing treatment is performed with the acid liquor to obtain a second solid product and a pickling solution, the solid product in the $n-1^{th}$ pickling container is subjected to an acid washing treatment by using the pickling solution obtained in the $n^{th}$ pickling container.

In the above process, the step-wise counter-current contacting of the first solid product with the acid liquor can further improve the ash removal effect.

The present disclosure does not impose limitation on the mass ratio of the acid in the acid liquor to the solid carbonaceous material to be treated, given that after the reaction of the alkali with the mineral components in the solid carbonaceous material to be treated, the mineral components can be destroyed or decomposed, and very few mineral components are introduced into the alkali treatment liquid by solid-liquid separation, in the meanwhile, the first solid product is subjected to an acid washing treatment by addition of the acid liquor, the destroyed or decomposed mineral components can be dissolved in the acid liquor, such that the ash is removed. Thus, the added amount of acid in the acid liquor can be flexibly adjusted depending on the kind and ash content of the solid carbonaceous material to be treated, and for example, in regard to the coal with a low ash content, a lower acid/coal ratio may be selected, such as 0.4:1; in regard to the coal with a high ash content, a high acid/coal ratio may be selected, such as 1.5:1.

Thus, optionally, the mass ratio of the acid in the acid liquor to the solid carbonaceous material to be treated is between 0.1-2:1.

Wherein the acid in the acid liquor may be nitric acid, hydrochloric acid or sulphuric acid.

The present disclosure does not impose limitation in regard to the mass fraction of the acid in the acid liquor.

In an embodiment of the present disclosure, the mass fraction of the acid in the acid liquor is within a range of 3-30%, preferably 5-20%.

The method for removing ash from the solid carbonaceous materials further comprises: washing the second solid product with water and drying the second solid product, so as to remove the residual acid liquor in the second solid product, during the process of carrying out the solid-liquid separation again to obtain the second solid product and the pickling solution.

The solid-liquid separation may be performed with a filtration process.

Wherein, the temperature and time of each acid washing treatment are not specifically limited.

In yet another embodiment of the present disclosure, each of the acid washing treatments is performed at a temperature of 10-99° C. for 5-180 minutes. Either the excessively high temperatures or the too long pickling time may causes ash to precipitate, which is not conducive to ash removal.

It has been discovered through experiments that the yield of second solid product may be 95-99% or more by using the ash removal process. The mass fraction of ash in the second solid product is 1% or less. The process can improve the properties of solid carbonaceous materials, such as the processed coal can meet the ultra-pure coal requirements, the utility value of coal is increased. When the processed coal is used for combustion, the calorific value is significantly improved, and environment pollution caused by ash is avoided.

Preferably, the mass fraction of ash in the second solid product is 0.2% or less.

The recovery of both the water washing solution, the acid liquor and the alkaline liquor can be carried out in accordance with the mature techniques in the art. For example, the water washing solution after the causticization treatment may be returned to the step (1) for recycling, and the acid was recovered and reused by means of roasting the pickling solution.

The embodiments of the present disclosure will be described in detail below with reference to comparative examples and examples. The comparative examples and examples are merely examples proposed for specifically describing the present disclosure, it shall be understood by those skilled in the art that the protection scope of the present disclosure is not limited by the comparative examples and examples.

For coal samples A and B, the results of the industrial analysis are shown in the following Table 1.

TABLE 1

| Coal sample | $M_{ad}$ | $A_{ad}$ | $V_{ad}$ | $FC_{ad}$ |
|---|---|---|---|---|
| A | 6.30 | 34.25 | 24.63 | 34.82 |
| B | 2.33 | 5.12 | 20.57 | 71.98 |

Wherein $M_{ad}$ is the mass percentage of moisture, $A_{ad}$ is the mass percentage of ash, $V_{ad}$ is the mass percentage of volatile components, and $FC_{ad}$ is the mass percentage of fixed carbon. The coal samples are crushed to particles with a particle size less than 5 mm, and a portion of the particles have a particle size less than 1 mm.

Example 1

400 g coal sample A was taken, and mixed with 700 g sodium hydroxide and 400 ml water (the mass fraction of sodium hydroxide was 63.6%, the alkali/coal ratio was 7:4, the mass ratio of alkaline liquor to coal sample A was 11:4), the mixture was subjected to a kneading reaction at 105° C. in an enclosed environment under an atmospheric pressure for 9 hours. 1 L of water was added to dilute and cool the mixture for 1 hour, the mixture was subjected to a filtering and washing process to obtain a first solid product (i.e., alkaline coal). 10 wt % diluted hydrochloric acid was added to the alkaline coal at an acid/coal ratio of 1.3:1, the alkaline coal was subjected to an acid washing treatment at a temperature of 60° C. for 30 minutes, the filtering and washing process was performed, and the filter cake was subjected to drying so as to obtain a second solid product (i.e., ultra-pure coal). The yield of ultra-pure coal was 97.1%, and the mass fraction of ash in the ultra-pure coal was 0.35 wt %.

Example 2

400 g coal sample A was taken, and mixed with 600 g sodium hydroxide and 300 ml water (the mass fraction of sodium hydroxide was 66.7%, the alkali/coal ratio was 3:2, the mass ratio of alkaline liquor to coal sample A was 9:4), the mixture was subjected to a kneading reaction at 150° C. in an enclosed environment under an atmospheric pressure for 5 hours. 1 L of water was added to dilute and cool the mixture for 30 minutes, the mixture was subjected to a filtering and washing process to obtain a first solid product (i.e., alkaline coal). 20 wt % diluted sulphuric acid was added to the alkaline coal at an acid/coal ratio of 1.1:1 in a counter-current contact manner, the alkaline coal was subjected to three times of acid washing treatments at a temperature of 99° C. for 60 minutes for each treatment, the filtering and washing process was performed, and the filter cake was subjected to drying so as to obtain a second solid product (i.e., ultra-pure coal). The yield of ultra-pure coal was 97.7%, and the mass fraction of ash in the ultra-pure coal was 0.43 wt %.

Example 3

400 g coal sample A was taken, and mixed with 600 g potassium hydroxide and 200 ml water (the mass fraction of potassium hydroxide was 75%, the alkali/coal ratio was 3:2, the mass ratio of alkaline liquor to coal sample A was 8:4), the mixture was subjected to a kneading reaction at 175° C. in an enclosed environment under an atmospheric pressure for 2 hours. 1 L of water was added to dilute and cool the mixture for 15 minutes, the mixture was subjected to a filtering and washing process to obtain a first solid product (i.e., alkaline coal). 15 wt % diluted nitric acid was added to the alkaline coal at an acid/coal ratio of 0.9:1 in a counter-current contact manner, the alkaline coal was subjected to four times of acid washing treatments at a temperature of 75° C. for 5 minutes for each treatment, the filtering and washing process was performed, and the filter cake was subjected to drying so as to obtain a second solid product (i.e., ultra-pure coal). The yield of ultra-pure coal was 98.0%, and the mass fraction of ash in the ultra-pure coal was 0.78 wt %.

Example 4

400 g coal sample B was taken, and mixed with 160 g sodium hydroxide and 100 ml water (the mass fraction of sodium hydroxide was 61.5%, the alkali/coal ratio was 0.4:1, the mass ratio of alkaline liquor to coal sample B was 2.6:4), the mixture was subjected to a kneading reaction at 120° C. in an enclosed environment under an atmospheric pressure for 6 hours. 1 L of water was added to dilute and cool the mixture for 30 minutes, the mixture was subjected to a filtering and washing process to obtain a first solid product (i.e., alkaline coal). 10 wt % diluted hydrochloric acid was added to the alkaline coal at an acid/coal ratio of 0.4:1 in a counter-current contact manner, the alkaline coal was subjected to five times of acid washing treatments at a temperature of 20° C. for 100 minutes for each treatment, the filtering and washing process was performed, and the filter cake was subjected to drying so as to obtain a second solid product (i.e., ultra-pure coal). The yield of ultra-pure coal was 99.1%, and the mass fraction of ash in the ultra-pure coal was 0.13 wt %.

Example 5

400 g coal sample B was taken, and mixed with 40 g sodium hydroxide and 40 ml water (the mass fraction of sodium hydroxide was 50%, the alkali/coal ratio was 0.1:1, the mass ratio of alkaline liquor to coal sample B was 0.8:4), the mixture was subjected to a kneading reaction at 200° C. in an enclosed environment under an atmospheric pressure for 0.5 hours. 1 L of water was added to dilute and cool the mixture for 30 minutes, the mixture was subjected to a filtering and washing process to obtain a first solid product (i.e., alkaline coal). 10 wt % diluted hydrochloric acid was added to the alkaline coal at an acid/coal ratio of 0.4:1 in a counter-current contact manner, the alkaline coal was subjected to three times of acid washing treatments at a temperature of 10° C. for 180 minutes for each treatment, the filtering and washing process was performed, and the filter cake was subjected to drying so as to obtain a second solid product (i.e., ultra-pure coal). The yield of ultra-pure coal was 99.3%, and the mass fraction of ash in the ultra-pure coal was 0.28 wt %.

Example 6

400 g coal sample A was taken, and mixed with 700 g sodium hydroxide and 400 ml water (the mass fraction of sodium hydroxide was 63.6%, the alkali/coal ratio was 7:4, the mass ratio of alkaline liquor to coal sample A was 11:4), the mixture was subjected to a kneading reaction at 100° C. in an enclosed environment under an atmospheric pressure for 9 hours. 1 L of water was added to dilute and cool the mixture for 1 hour, the mixture was subjected to a filtering and washing process to obtain a first solid product (i.e., alkaline coal). 10 wt % diluted hydrochloric acid was added to the alkaline coal at an acid/coal ratio of 1.3:1 in a counter-current contact manner, the alkaline coal was subjected to three times of acid washing treatments at a temperature of 99° C. for 30 minutes for each treatment, the filtering and washing process was performed, and the filter cake was subjected to drying so as to obtain a second solid product (i.e., ultra-pure coal). The yield of ultra-pure coal was 97.2%, and the mass fraction of ash in the ultra-pure coal was 0.12 wt %.

Example 7

400 g coal sample A was taken, and mixed with 700 g sodium hydroxide and 400 ml water (the mass fraction of sodium hydroxide was 63.6%, the alkali/coal ratio was 7:4, the mass ratio of alkaline liquor to coal sample A was 11:4), the mixture was subjected to a standing still process at 100° C. in an enclosed environment under an atmospheric pressure for 9 hours. 1 L of water was added to dilute and cool the mixture for 1 hour, the mixture was subjected to a filtering and washing process to obtain a first solid product (i.e., alkaline coal). 10 wt % diluted hydrochloric acid was added to the alkaline coal at an acid/coal ratio of 1.3:1 in a counter-current contact manner, the alkaline coal was subjected to three times of acid washing treatments at a temperature of 99° C. for 30 minutes for each treatment, the filtering and washing process was performed, and the filter cake was subjected to drying so as to obtain a second solid product (i.e., ultra-pure coal). The yield of ultra-pure coal was 97.1%, and the mass fraction of ash in the ultra-pure coal was 0.98 wt %.

Comparative Example 1

100 g coal sample A was taken, and mixed with 200 g sodium hydroxide and 800 ml water (the mass fraction of sodium hydroxide was 20%, the alkali/coal ratio was 2:1, the mass ratio of alkaline liquor to coal sample A was 10:1), the mixture was subjected to a stirring reaction at 250° C. under the corresponding saturated vapor pressure (about 40 atmospheric pressure) for 6 hours. The mixture was subjected to a filtering and washing process to obtain an alkaline coal. 10 wt % diluted hydrochloric acid was added to the alkaline coal at an acid/coal ratio of 1.3:1, and subjected to leaching at 60° C. for 30 minutes, the filtering and washing process was performed, and the filter cake was subjected to drying so as to obtain the ultra-pure coal. The yield of ultra-pure coal was 57.9 wt %, and the mass fraction of ash in the ultra-pure coal was 5.67 wt %.

Comparative Example 2

100 g coal sample A was taken, and mixed with 400 g sodium hydroxide and 600 ml water (the mass fraction of sodium hydroxide was 40%, the alkali/coal ratio was 4:1, the mass ratio of alkaline liquor to coal sample A was 10:1), the mixture was subjected to a stirring reaction at 250° C. under the corresponding saturated vapor pressure (about 40 atmospheric pressure) for 6 hours. The mixture was subjected to a filtering and washing process to obtain an alkaline coal. 10 wt % diluted hydrochloric acid was added to the alkaline coal at an acid/coal ratio of 1.3:1, and subjected to leaching at 60° C. for 30 minutes, the filtering and washing process was performed, and the filter cake was subjected to drying so as to obtain the ultra-pure coal. The yield of ultra-pure coal was 65.1 wt %, and the mass fraction of ash in the ultra-pure coal was 3.53 wt %.

Comparative Example 3

100 g coal sample B was taken, and mixed with 80 g sodium hydroxide and 320 ml water (the mass fraction of sodium hydroxide was 20%, the alkali/coal ratio was 4:5, the mass ratio of alkaline liquor to coal sample B was 4:1), the mixture was subjected to a stirring reaction at 220° C. under the corresponding saturated vapor pressure (about 20 atmospheric pressure) for 6 hours. The mixture was subjected to a filtering and washing process to obtain an alkaline coal. 10 wt % diluted hydrochloric acid was added to the alkaline coal at an acid/coal ratio of 0.4:1, and subjected to leaching at 75° C. for 30 minutes, the filtering and washing process was performed, and the filter cake was subjected to drying so as to obtain the ultra-pure coal. The yield of ultra-pure coal was 79.7%, and the mass fraction of ash in the ultra-pure coal was 1.39 wt %.

As can be seen from the Examples 1-6 and Comparative Examples 1-3, in regard to the coal sample A having a high ash content and the coal sample B having a low ash content, the mass fraction of alkali is 50% or higher, the reaction can be performed under a normal pressure, and the activity is increased, the addition amount of alkali can be reduced by more than 50%, and the used amount of water is reduced, the reaction temperature of the alkaline coal can be lowered by 50-100° C., and the finally produced ultra-pure coal has a high yield and a significantly reduced ash content. As can be seen from the comparison result of Example 6 and Example 1, the alkaline coal was subjected to an acid washing treatment in a multi-stage counter-current contacting manner, the ash removal effect can be further improved, and the mass fraction of ash in the obtained ultra-pure coal may be 0.2% or lower. Furthermore, a kneading process is performed in the alkaline coal reaction in Examples 1-6, which have a reduced amount of pulverized coal and an improved yield of the ultra-pure coal as well as an improved effect of ash removal, compared with the stirring process in the Comparative Examples 1-3; in addition the kneading process is more conducive to ash removal than the standing still and reaction process in the Example 7.

The above content merely elaborate the specific embodiments of the present application, but the protection scope of the present disclosure is not limited thereto. Any variation or replacement which can be easily envisaged by those skilled in this technology field without departing from the inventive concept of the present disclosure shall fall into the protection scope of the present application. Therefore, the protection scope of the present disclosure shall be subjected to the protection scope of the claims.

The invention claimed is:

1. A method for removing ash from the solid carbonaceous materials comprising:
    S1) mixing a sub-molten salt medium of an alkali with a solid carbonaceous material to be treated, heating the mixture to react the alkali with the ash in the solid carbonaceous material to be treated in the sub-molten salt medium of the alkali, and subjecting the reacted mixed slurry to a solid-liquid separation to obtain a first solid product and an alkali treatment liquid, wherein the mass fraction of said alkali in the sub-molten salt medium of the alkali is 50% or more, wherein the mass ratio of the alkali to the solid carbonaceous materials to be treated is 0.1-2:1;
    S2) subjecting the first solid product to an acid washing treatment with an acid liquor and performing solid-liquid separation once more to obtain a second solid product and a pickling solution.

2. The method for removing ash from the solid carbonaceous materials of claim 1, wherein the sub-molten salt medium of the alkali is mixed with the solid carbonaceous materials to be treated under a kneading action.

3. The method for removing ash from the solid carbonaceous materials of claim 1, wherein the reaction is performed under a temperature within a range of 100-200° C. and a normal pressure for 0.5-9 h.

4. The method for removing ash from the solid carbonaceous materials of claim 1, wherein the method for removing ash further comprises cooling the reacted mixed slurry by means of dilution with water prior to subjecting the reacted mixed slurry to a solid-liquid separation.

5. The method for removing ash from the solid carbonaceous materials of claim 4, wherein the temperature after the cooling process is within a range of 10-99° C.

6. The method for removing ash from the solid carbonaceous materials of claim 5, wherein the cooling time is 3 h or less.

7. The method for removing ash from the solid carbonaceous materials of claim 1, wherein a $n^{th}$ acid washing treatment is performed with the acid liquor in counter-current contact with the first solid product, wherein n is equal to or greater than 2.

8. The method for removing ash from the solid carbonaceous materials of claim 7, wherein the $n^{th}$ acid washing treatment is performed with the acid liquor in counter-current contact with the first solid product, the acid washing treatment comprises:

a solid product obtained after an $i-1^{th}$ acid washing treatment is subjected to an acid washing treatment by using a pickling solution obtained after an $i^{th}$ acid washing treatment, and the first solid product is subjected to an acid washing treatment by using a pickling solution obtained after a second acid washing treatment, wherein i is a natural number and $2 \leq i \leq n$.

9. The method for removing ash from the solid carbonaceous materials of claim 1, wherein the yield of the second solid product is equal to or greater than 95%.

10. The method for removing ash from the solid carbonaceous materials of claim 1, wherein the mass fraction of ash in the second solid product is 1% or less.

11. The method for removing ash from the solid carbonaceous materials of claim 10, wherein the mass fraction of ash in the second solid product is 0.2% or less.

* * * * *